(12) United States Patent
Rainer et al.

(10) Patent No.: US 8,391,317 B2
(45) Date of Patent: Mar. 5, 2013

(54) UNIT OF THE TRANSMISSION OF DATA IN A SERIAL BIDIRECTIONAL BUS

(75) Inventors: Josef Rainer, Franking (AT); Erwin Bernecker, Hochburg (AT)

(73) Assignee: Bernecker + Rainer Industrie-Elektronik Gesellschaft m.b.H., Eggelsberg (AT)

( * ) Notice: Subject to any disclaimer, the term of this patent is extended or adjusted under 35 U.S.C. 154(b) by 668 days.

(21) Appl. No.: 10/574,403

(22) PCT Filed: Oct. 1, 2004

(86) PCT No.: PCT/AT2004/000334
§ 371 (c)(1),
(2), (4) Date: May 17, 2006

(87) PCT Pub. No.: WO2005/034439
PCT Pub. Date: Apr. 14, 2005

(65) Prior Publication Data
US 2007/0008908 A1 Jan. 11, 2007

(30) Foreign Application Priority Data
Oct. 3, 2003 (AT) .............................. A 1569/2003

(51) Int. Cl.
*H04J 3/00* (2006.01)
*H04L 12/413* (2006.01)
(52) U.S. Cl. ...................................... 370/498; 370/445
(58) Field of Classification Search .................. 370/498, 370/85.1
See application file for complete search history.

(56) References Cited

U.S. PATENT DOCUMENTS

| 4,885,538 | A | * | 12/1989 | Hoenniger et al. | ........... 324/312 |
| 5,001,755 | A | | 3/1991 | Skret | |
| 5,434,861 | A | | 7/1995 | Pritty et al. | |
| 5,448,562 | A | * | 9/1995 | Osakabe et al. | ............... 370/392 |
| 5,631,850 | A | * | 5/1997 | Tanaka et al. | .................. 702/122 |

(Continued)

FOREIGN PATENT DOCUMENTS

| EP | 1 223 710 A | 7/2002 |
| GB | 2 350 985 A | 12/2000 |

(Continued)

OTHER PUBLICATIONS

International Search Report in English language, Sep. 5, 2005.

*Primary Examiner* — Mark Rinehart
*Assistant Examiner* — Angel Brockman
(74) *Attorney, Agent, or Firm* — Greenblum & Bernstein, P.L.C.

(57) ABSTRACT

A system is described for transmitting data in a serial bidirectional bus with a control device (1) comprising a send and receiving unit (34) for data fields (7, 8 and 9) combined into a data frame (6), and with bus subscribers (2, 3 and 4) which comprise an evaluation circuit (10) for reading in and reading out data fields (7, 8, 9, 14, 15 or 16) in data frames (6, 11), with at least the bus subscriber (4) at the bus end opposite of the control device (1) comprising a send device (12) for a data frame (11). In order to provide simple constructional conditions it is proposed that at least the bus subscriber (4) at the end of the bus comprises a control stage (13) which is activated by a received data frame (6) and triggers the send device (12) depending on the receipt of a data frame (6) within the terms of the transmission of a data frame (11) for at least the data fields (14, 15 and 16) of the bus subscribers (2, 3 and 4).

9 Claims, 2 Drawing Sheets

U.S. PATENT DOCUMENTS

| | | | |
|---|---|---|---|
| 5,715,475 A * | 2/1998 | Munson et al. | 710/10 |
| 5,898,666 A * | 4/1999 | Fukuda | 370/280 |
| 5,974,475 A * | 10/1999 | Day et al. | 710/9 |
| 6,122,257 A * | 9/2000 | Machida et al. | 370/252 |
| 6,347,252 B1 * | 2/2002 | Behr et al. | 700/3 |
| 6,683,848 B1 * | 1/2004 | Parrish | 370/218 |
| 6,757,766 B1 * | 6/2004 | Hutner et al. | 710/107 |
| 6,928,501 B2 * | 8/2005 | Andreas et al. | 710/110 |
| 7,583,692 B2 * | 9/2009 | Fuhrmann et al. | 370/458 |
| 2002/0128986 A1 * | 9/2002 | Stutz | 705/401 |
| 2003/0014693 A1 * | 1/2003 | Goodman et al. | 714/31 |
| 2003/0128702 A1 * | 7/2003 | Satoh et al. | 370/390 |
| 2005/0083954 A1 * | 4/2005 | Meyer-Grafe | 370/403 |

FOREIGN PATENT DOCUMENTS

| | | |
|---|---|---|
| WO | PCT/AT2003/0001 | 1/2003 |
| WO | PCT/AT03/0001 | 4/2006 |

* cited by examiner

UNIT OF THE TRANSMISSION OF DATA IN A SERIAL BIDIRECTIONAL BUS

CROSS REFERENCE TO RELATED APPLICATIONS

Applicants claim priority under 35 U.S.C. §119 of Austrian Application No. A 1569/2003 filed Oct. 3, 2003. Applicants also claim priority under 35 U.S.C. §365 of PCT/AT/2004/000334 filed Oct. 1, 2004. The international application under PCT article 21 (2) was not published in English.

FIELD OF THE INVENTION

The invention relates to a system for transmitting data in a serial bidirectional bus with a control device comprising a send and receiving unit for data fields combined into a data frame, and with bus subscribers that comprise an evaluation circuit for reading in and reading out data fields in data frames, with at least the bus subscriber at the bus end opposite of the control device comprising a send device for a data frame.

DESCRIPTION OF THE PRIOR ART

In order to enable the synchronization of the data transmission in systems for transmitting data in a serial bidirectional bus, it is known (PCT/AT03/0001) to send a control signal from a control device to all bus subscribers. Following this control signal, the data transmission is commenced with a transmission to the control device, such that the bus subscriber at the bus end sends a data frame in the direction of the control device via the serial bidirectional bus. Said data frame consists at first only of the data field of the bus subscriber at the bus end and increases in size in the direction of the control device because the other bus subscribers attach their own data fields to the end of said data frame with the help of an evaluation circuit. It has been noticed however that in a large number of cases, especially in the case of low signal-to-noise ratios in the signal transmission or even in the case of large distances between the bus subscribers, the evaluation circuit required for the data transmission is comparatively complex with respect to its constructional configuration. This is especially necessary because the respective evaluation circuits need to prevent in particular that the distances between the data fields occur in the insertion of the respective data fields. An additional factor is that the evaluation circuits will often not correctly recognize the end of the respective data frame for attaching the own data fields, so that erroneous data transmission needs to be expected. A repetition of the data transmission negatively reduces the data transmission rate, which is also limited by the control pulse to be transmitted.

SUMMARY OF THE INVENTION

The invention is thus based on the object of providing a system for data transmission in a serial bidirectional bus of the kind mentioned above in such a way that the system is characterized not only by the simplicity of the data transmission but also by its low constructional complexity. A high data transmission rate is also to be ensured.

This object is achieved by the invention in such a way that at least the bus subscriber at the end of the bus comprises a control stage which is activated by a received data frame and which triggers the send device depending on the receipt of a data frame within the terms of the transmission of a data frame for at least the data fields of the bus subscribers.

By providing the synchronization of the bus subscribers via a received data frame it is not only possible to omit control signals in contrast to the state of the art, but it is also possible in a simple way to inform the respective bus subscribers when the bidirectional bus may be used for the own data transmission. For such a data transmission, the bus subscriber at least at the bus end comprises a control stage which can be activated b the received data frame and which triggers the send device depending on the receipt of the data frame within the terms of dispatching a data frame for at least the data fields of the bus subscribers. The respective other bus subscribers can then enter their own data fields in these data frames, namely in a region predetermined for each them without having to ensure a gapless concatenation of the data fields to the end of a data frame with constructional complex measures as compared to the state of the art. The system in accordance with the invention is therefore comparatively easy to realize and also offers high security in data transmission. Moreover, a higher data transmission rate can be ensured as compared with the state of the art because no control signals are required.

When each bus subscriber comprises a control stage for a send device for sending a data frame for the own and the data fields of the bus subscribers which lie between the control device and the respective bus subscriber, a bus subscriber can fail and a limited data transmission can be maintained nevertheless. It is only necessary that the bus subscriber directly preceding the failed bus subscriber prepare and send a data frame corresponding to the requirements of the bus subscribers remaining in this shortened bus. A partial operation of the serial bus can be maintained despite the failure of a bus subscriber.

When the bus subscribers comprise a memory for the position of the data fields which can be read in and out via the evaluation circuit within the respective data frame, it is not only possible to freely choose the sequence of the data fields in the data frame relating to the bus subscribers prior to putting the system into operation, but it is also possible to change the position of the data fields during the operation of the system. Said new position only needs to be saved to the memory of the respective bus subscriber, as a result of which the sequence of the data fields can be chosen according to their urgency for example, which is in contrast to the state of the art. It is further also possible that when adding or removing a bus subscriber, the positions of the data fields need to be changed, which is again very easily possible via the position data in the memory of the bus subscribers.

To ensure that the allocation work can be simplified with respect to the position of the data fields in a data frame, the control device comprises an allocation stage for the position of the data fields within a data frame which can be allocated to the individual bus subscribers. The respective bus subscribers are informed via the bus about the allocated position, so that a construction is obtained which can be adapted in a comparatively simple way. For this purpose the control device comprises an initialization device for reading out the positional data in data fields addressed to the individual bus subscribers, with the bus subscribers then reading out by way of an initialization circuit the address-related positional data from the addressed data fields into the memory for these positional data.

A test circuit of the bus subscriber can then be used for example to measure electric parameters of the connecting lines connected to the bus subscribers, which enables each bus subscriber to determine whether there is a further connected bus subscriber.

Based on the preparation of check data from the data frame it is possible to easily recognize errors in the data transmission. As is known, the bus subscribers each comprise an encoding device which produce check data from the data frame, which check data are dispatched with the respective data frame. When such a data frame is received with the check data, it is merely necessary to determine the correctness of the check data with a checking device. If an error in the data transmission is recognized, then this can be corrected for example by a request for a renewed transmission of a data frame.

By predetermining addresses for the individual bus subscribers it is possible for the control device to prepare special data frames. These data frames can be used for initializing the system, because in this case it is necessary to inform the bus subscribers about bus-specific data, e.g. their position of the data fields in the data frame. These data frames which are now provided with addresses can also be sent by the control device in a time window not required by the other transmission cycle, so that addressed bus subscribers can preferably be supplied with data. The transmission cycles for all bus subscribers therefore need not necessarily be configured according to the highest transmission rates.

BRIEF DESCRIPTION OF THE DRAWINGS

The subject matter of the invention is shown by way of example in the drawings, wherein.

DESCRIPTION OF THE PREFERRED EMBODIMENT

Figure 1:
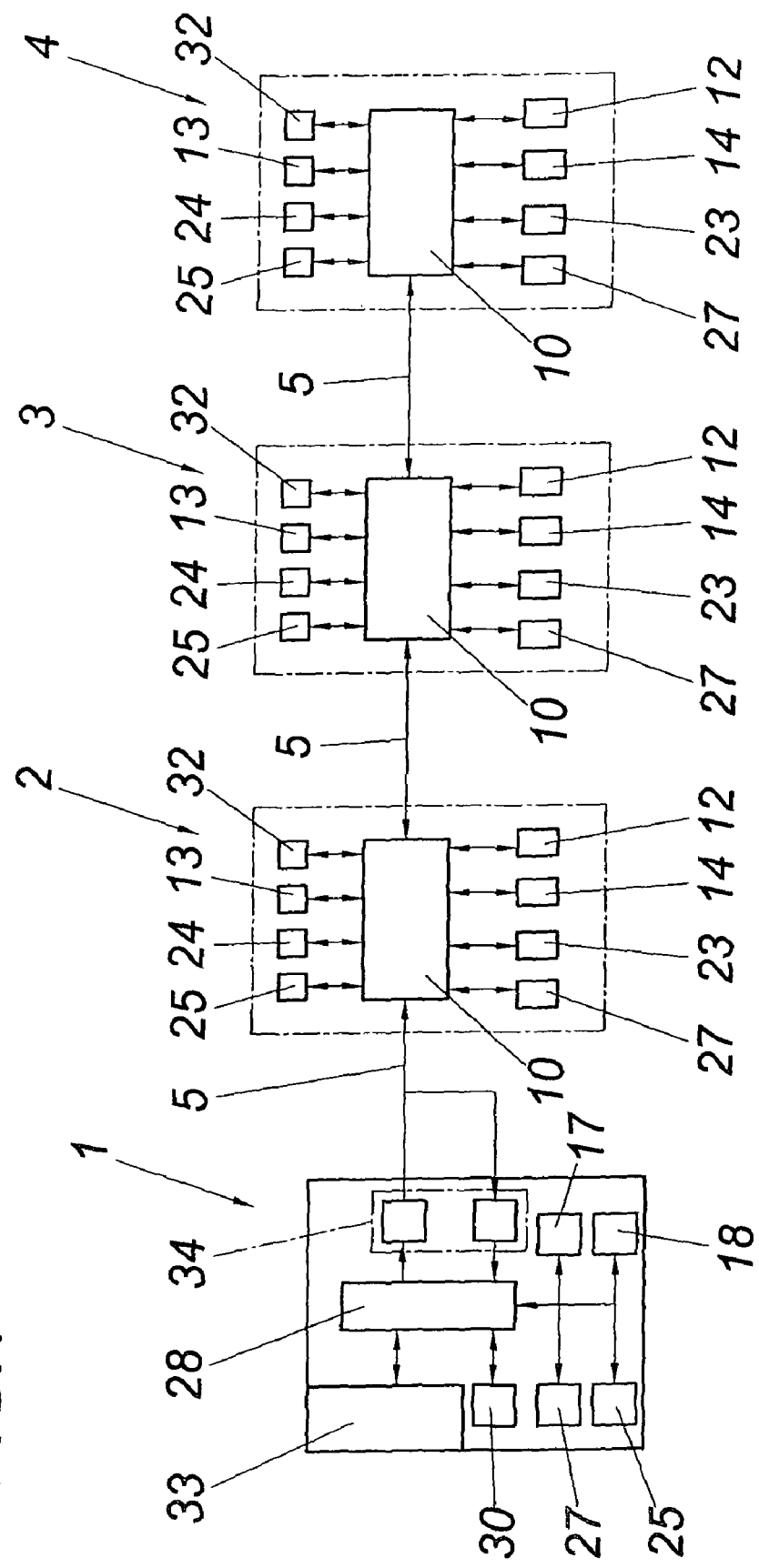
FIG. 1 shows a system in accordance with the invention for data transmission in a serial bus in a block diagram.
Figure 2:
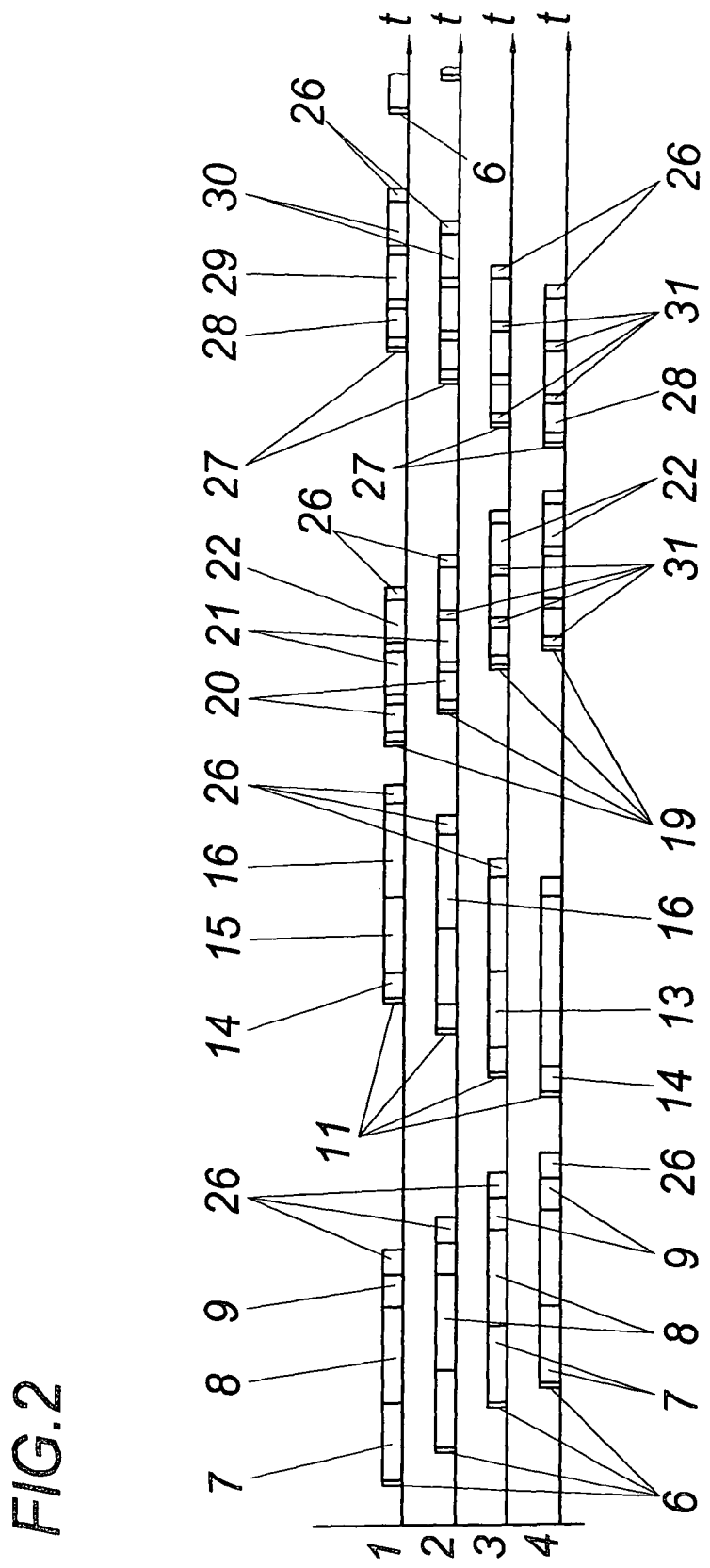
FIG. 2 shows the time sequence of a data transmission in the bus according to FIG. 1.

According to the illustrated embodiment, the serial bus comprises a control device 1 and three bus subscribers 2, 3 and 4 which are connected with each other via a bidirectional line 5. A send and receiving unit 34 of the control device 1 sends to the bus subscribers 2, 3 and 4 according to FIG. 2 a data frame 6 with data fields 7, 8 and 9 for the bus subscribers 2, 3 and 4. The data frame 6 is received in a time-offset manner by the bus subscribers 2, 3 and 4, wherefrom the bus subscribers 2, 3 and 4 take their respective data fields 7, 8 or 9 via en evaluation stage 10 because the bus subscribers 2, 3 and 4 know the respective position of their data fields 7, 8, 9, 14, 15 or 16 of data frame 6, 11 to be read in or out. When a data frame 6 is received by bus subscriber 4 at the end of the bidirectional serial bus opposite of the control device 1, said bus subscriber 4 sends a data frame 11 via its send device 12 in the direction of control device 1. For this purpose, the bus subscriber 4 comprises at the bus end a control stage 13 which can be activated by a received data frame 6, which control stage activates the send device 12 depending on the receipt of the data frame 6 within the terms of sending a data frame 11. This data frame 11 can receive at least the data fields 14, 15 and 16 of the bus subscribers 2, 3 and 4 to be read out, so that its size does not change even with an insertion of the data fields 15 and 16 of the data frame 11. Such an insertion can be performed in the known manner with the evaluation circuit 10 of the respective bus subscriber 2 and 3.

Each bus subscriber 2, 3 and 4 comprises a control stage 13 for a send device 12 for sending a data frame 11 for the own data fields and the data fields of the preceding bus subscribers, so that a data transmission is still at least partly possible during a failure of a bus subscriber 3 or 4. In such a case, the bus subscriber 2 or 3 situated directly in front of the failed bus subscriber 3 and 4 will send a respective data frame to the control device 1.

In order to change the position of the data fields 7, 8, 9, 14, 15 or 16 in the data frames 6, 11 to be read in or out, the respective positional data are saved to a memory 14 of the respective bus subscribers 2, 3 or 4. For reading out the respective data fields 7, 8 or 9 from a data frame, the respective evaluation circuit 10 accesses such positional data in the memory 14 beforehand. The respective evaluation circuit 10 thus knows the allocated position in the data frame 11 when reading out the data fields 14, 15 or 16 in the same manner as when reading in the data fields 7, 8 or 9.

The control device 1 further comprises an allocation stage 17 for the position of the data fields 7, 8, 9, 14, 15, and 16 in the data frames 6 and 11 which can be allocated to the individual bus subscribers 2, 3 and 4. This position is read into a data frame 19 by an initialization device 18 of the control device 1 with data fields 20, 21 and 22 addressed to the individual bus subscribers 2, 3 or 4 and is sent by the send and receiving device 34 to the bus subscribers 2, 3 and 4. The bus subscribers 2, 3 and 4 obtain these positional data from said data frame 19 with its initialization circuit 23 and read the same into the memory 14.

Each bus subscriber 2, 3 and 4 comprises a test circuit 24 for recognizing a bus subscriber 2 or 3 which is connected to the bus 5 and is connected in outgoing circuit. Each bus subscriber 2, 3 and 4 can thus determine for example whether it is located at the end of the bus.

In order to recognize errors in the data transmission, the encoding device 25 of control device 1 generates check data 26 from each data frame 6 and 19 to be sent, which check data are sent with the data frames 6 and 19. A check device 27 of the bus subscribers 2, 3 and 4 allows evaluation stage 10 to read in and out the respective data fields 7, 8, 9, 20, 21 or 22 if they were transmitted free from errors. When the data frames 11 or 27 are supplemented with data fields 14, 15, 16, 28, 29 or 30 to be read in by the bus subscribers 2, 3 or 4, the encoding device 25 of the respective bus subscriber 2, 3 or 4 replaces the received check data 26 by new check data 26 which are formed from the data frame 11 or 27 whose data has been changed. The new check data 26 are appended to the end of the data frame 11 or 27 for example. In addition, the control device 1 comprises a check device 27 in order to allow the computing unit 28 to read out the received data frame 11 or 27 only after a successful check of the received check data 26.

The control device 1 comprises an address memory 30 for the addresses 31 of the bus subscribers 2, 3 and 4, which control device is connected to the computing unit 28. In an advantageous embodiment, the control device 1 can provide data fields 19, 26 with addresses 31 of the respective bus subscribers 2, 3 or 4 in order to thus supply the bus subscribers 2, 3 and 4 with bus-specific data, e.g. even initialization data. The data frames for these transmittable data fields are designated in FIG. 2 with 19 and 27. A recognition circuit 32 of each bus subscriber 2, 3 or 4 allows its respective evaluation stage 10 to read out the data field 20, 21 or 22 when the address 31 corresponds. The send device 12 of the bus subscriber 4 at the bus end sends a data frame 27 for its own data field 28 and for the data fields 29 and 30 of the upstream bus subscribers 2 and 3 back in the direction of the control device 1, with the data fields 29 and 30 being provided with addresses 31. The recognition circuits 32 of the other bus subscribers 2 and 3 then allow the respective evaluation stages 10 to supplement the data frame 27 with the data field 29 or 30 which is to be read out and is already provided with an address 31.

A new transmission cycle is started with a renewed sending of a data frame 6 by the control device 1, which time can be freely chosen by the control device after the receipt of the data frame 11 from bus subscriber 4 at the bus end. Furthermore, the control device 1 comprises an interface 33 which is connected with the computing unit 28 and by means of which the system can be connected with other systems.

The invention claimed is:

1. A data transmitting system for a serial bidirectional bus comprising:
   a control device comprising a send and receiving unit for data fields combined into a data frame, and
   a plurality of bus subscribers connected in series to the control device, each bus subscriber comprising an evaluation circuit for reading in and reading out data fields in data frames,
   wherein each bus subscriber comprises a test circuit to determine whether it is located at a bus end of the series connected subscribers opposite of the control device,
   at least the bus subscriber at the bus end comprising a send device for a data frame,
   wherein the at least the bus subscriber at the bus end comprises a control stage which is activated by a received data frame sent by the control device over the series connected plurality of bus subscribers and triggers the send device depending on the receipt of the data frame,
   the send device being structured to send a data frame over the series connected plurality of bus subscribers in the direction opposite a send direction of the data frame sent from the control device, wherein the sent data frame from the send device contains at least data fields for all subscribers and said data frame is handed over from one bus subscriber to the next bus subscriber.

2. A data transmitting system according to claim 1,
   wherein each of the bus subscribers comprises a control stage for a send device for sending a data frame for the own data fields and the data fields of the bus subscribers which lie between the control device and the respective bus subscribers.

3. A data transmitting system according to claim 1,
   wherein the bus subscribers comprise a memory for the position of the data fields within the respective data frame, which data fields can be read in and out via the evaluation circuit.

4. A data transmitting system according to claim 3,
   wherein the control device comprises an allocation stage for the position of the data fields within a data frame which can be allocated to the individual bus subscribers and an initialization device for reading out the positional data in data fields of a data frame addressed to the individual bus subscribers, and that the bus subscribers comprise an initialization circuit for the address-related reading out of the positional data from the addressed data fields of the data frame into the memory for these positional data.

5. A data transmitting system according to claim 1,
   wherein each bus subscriber comprises a test circuit for recognizing a bus subscriber connected to the bus and connected in outgoing circuit with the same.

6. A data transmitting system according to claim 1,
   wherein the control device and the bus subscribers each comprise an encoding device for producing check data from the data frame, and that as is known the control device and the bus subscribers each comprise a check device for check data received with the data frames.

7. A data transmitting system according to claim 1,
   wherein the control device comprises an address memory for the addresses of the bus subscribers and that each bus subscriber comprises a recognition circuit for triggering the evaluation circuit for reading out the data field in the data frame addressed to the bus subscriber on the one hand and for reading in its data field into the data frame on the other hand.

8. A data transmitting system according to claim 1,
   wherein multiple data fields are sent simultaneously in a single data frame and at a time.

9. A data transmitting system according to claim 1, wherein the plurality of bus subscribers are connected in series with each other and to the control device through bidirectional lines that transmit in one direction the data frame from the send device of the at least the bus subscriber at the bus end and to transmit in a direction opposite the one direction the data frame from the control device.

* * * * *